United States Patent
Padamsee

Patent Number: 5,168,793
Date of Patent: Dec. 8, 1992

[54] VACUUM VESSEL WITH HEAT INPUT PORTAL AND BEVERAGE BREWING SYSTEM USED THEREWITH

[75] Inventor: Riaz A. Padamsee, Durham, N.C.

[73] Assignee: Eagle Flask, Inc., Durham, N.C.

[21] Appl. No.: 757,651

[22] Filed: Sep. 10, 1991

Related U.S. Application Data

[63] Continuation-in-part of Ser. No. 581,474, Sep. 12, 1990, abandoned.

[51] Int. Cl.⁵ .................................... A47J 31/00
[52] U.S. Cl. .................................... 99/279; 215/12.1; 215/13.1; 220/423
[58] Field of Search ............... 99/279, 288, 295, 323; 126/373; 215/12.1, 13.1; 220/420, 423; 222/130, 131, 146.5

[56] References Cited

U.S. PATENT DOCUMENTS

| | | | |
|---|---|---|---|
| 1,498,837 | 6/1924 | Hale | 215/12.1 |
| 1,549,743 | 8/1925 | Bultman et al. | 215/12.1 |
| 1,566,221 | 12/1925 | Lindemuth | 215/12.1 |
| 1,760,378 | 5/1930 | Siegheim | 215/12.1 |
| 2,448,589 | 9/1948 | Gulick | 215/12.1 |
| 2,725,733 | 6/1947 | Davis | 220/420 |
| 4,356,381 | 10/1982 | Flaherty, Jr. et al. | 99/288 |
| 4,653,469 | 3/1987 | Miyaji et al. | 220/420 |

FOREIGN PATENT DOCUMENTS

| | | | |
|---|---|---|---|
| 3406-918-A | 9/1985 | Fed. Rep. of Germany | 215/13.1 |
| 3807559 | 9/1989 | Fed. Rep. of Germany | 215/13.1 |
| 4455 | 2/1904 | United Kingdom | 222/131 |

Primary Examiner—Harvey C. Hornsby
Assistant Examiner—Mark Spisich
Attorney, Agent, or Firm—Fish & Richardson

[57] ABSTRACT

A storage flask for maintaining a brewed beverage in a selected elevated temperature state includes a pair of spaced substantially gas-impermable inner and outer walls with interior facing wall surfaces in spaced relationship to one another that enclose an interior lacuna therebetween with subatmospheric pressure conditions in the lacuna. The inner wall defines an inner containment volume for storing the brewed beverage. A first portion of the spaced inner and outer walls is infrared radiation-absorbing in character and forms a heat input portal so that heat incident on the outer wall is radiatively transmitted by the portal to the containment volume for maintaining the brewed beverage in the containment volume at a temperature greater than ambient; and a second portion of the inner and outer walls is infrared radiation reflective in character and bounds the first portion.

16 Claims, 1 Drawing Sheet

VACUUM VESSEL WITH HEAT INPUT PORTAL AND BEVERAGE BREWING SYSTEM USED THEREWITH

CROSS REFERENCE TO RELATED APPLICATIONS

This application is a continuation-in-part of application Ser. No. 07/581,474, filed Sep. 12, 1990, abandoned.

BACKGROUND OF THE INVENTION

1. Field of the Invention

This invention relates generally to devices for containing a liquid and maintaining the contained liquid such as coffee, at a fairly constant temperature, and to methods for maintaining liquids within a desired temperature range using such devices. Such devices include vacuum insulated flasks which maintain the temperature of the liquid stored within such flasks by imposing a thermal barrier which reduces the rate of heat transfer into or out of the container, and heater/flask systems, such as electric coffee makers, which, through the use of a resistance heater and either a glass or metal flask, maintain the temperature of the stored liquid by introducing heat to pre-heat the flask and subsequently, to maintain the temperature of the heated liquid in the flask.

2. Description of the Related Art

Although the device of the present invention is derived from and most closely related to the vacuum insulated flask, unlike ordinary vacuum insulated flasks, the device is adapted for use in hot beverage brewing and warming systems, such as those used to brew coffee or tea. In particular, the device relates to that portion of the art concerned with maintenance of the temperature of the brewed beverage, rather than heating of water and brewing the beverage. Most coffee and tea brewers on the market consist of a water heater of the continuous flow type into which cold water is introduced, a brewing chamber in which the coffee grounds or tea leaves are placed, a delivery system which introduces heated water into the brewing chamber, a storage flask in which the freshly brewed beverage is collected and a system for maintaining the temperature of the collected beverage within the storage flask. This invention relates to the system for maintaining the temperature of the collected beverage within the storage flask.

Ordinary silvered glass vacuum insulated flasks are not often used as collection devices in such systems, since, although they are able to slow the cooling of the beverage due to their insulating properties, these very insulating properties usually prevent heat from being introduced into the flask from an external heat source, thus lessening the desirability of using vacuum insulated flasks in such systems. Because of the inability to efficiently introduce heat into the vacuum insulated flask once the liquid is placed in it, the amount of time during which the liquid can be maintained at the desired temperature in vacuum insulated flask is a direct function of the flask's insulating properties and is thus limited.

In the present state of the art, the preferred storage flask in beverage brewing systems is made of single-walled, heat resistant glass. The temperature of the brewed beverage within the storage flask is maintained by an electric resistance heating element imbedded within or placed directly underneath a heat-conductive platform on which the storage flask rests. Higher-priced models have higher quality heating elements, thermostatic controls or more efficient conducting materials in the platform to create a more constant and even distribution of heat across the surface of the platform on which the storage flask rests.

Variations currently in existence include systems in which the heating element is integrated into the storage flask and systems in which an insulating jacket is wrapped around the storage flask. The combination of storage flask with heating element allows for a more efficient thermal coupling between the storage flask and the heating element. Often the integrated system also includes an insulated jacket surrounding the storage flask, to increase the unit's efficiency by reducing the amount of heat which must be introduced to maintain the brewed beverage at a desired elevated temperature.

The advantages obtained by integration of the storage flask and heating element are offset by several disadvantages. First, the integrated device is more difficult to clean. If the flask/heater is made sufficiently waterproof to allow for immersion cleaning, the cost of manufacture rises significantly. Finally, the cost of replacement parts is increased. The storage flask is the most often broken part of the system. Where the storage flask is integrated with a heating element, the cost of replacement is increased. Further, commercial coffee brewers often have replaceable heating platforms. Integration of the heating element into the storage flask makes replacement of broken or defective heating elements more difficult and costly. In general, such integrated systems tend to be preferred only when the need for portability and compactness outweigh these disadvantages.

As discussed above, prior to the present invention, use of double-walled vacuum insulated flasks in hot beverage brewing and storage systems was inefficient due to the difficulties of introducing heat into such flasks. However, some systems attempt to reduce the amount of heat required to maintain the temperature of the brewed beverage in the single-walled storage flask by surrounding the flask on its vertical surfaces with an insulating jacket. Use of an insulating jacket surrounding the exterior surface of such a storage flask provides some of the advantages of a vacuum insulated flask but with a significantly less efficient thermal barrier.

A disadvantage of temperature maintenance systems employing electric resistance elements, which to applicant's knowledge are employed in all hot beverage brewing/storage systems, in conjunction with single-walled storage flasks is that such heating systems tend significantly to accelerate the degradation of aroma and taste qualities of the stored hot beverage. In coffee, for example, many of the components of the taste and aroma of the beverage are heat labile. While a certain loss of taste and aroma over time is inevitable when the beverage is stored in an open container due to the volatility of certain taste components, this degradation of taste and aroma occurs much more rapidly in systems where temperature is maintained by introducing heat via electric resistance heating elements to compensate for the large heat losses in a non-insulated or poorly insulated, single-walled storage flask.

The increased rate of flavor deterioration is a function of the localized high temperature to which the stored beverage nearest the surface of the heating element is subjected and the amount of time the stored beverage is subjected to elevated temperature. In order to keep the liquid in the flask at a selected elevated temperature, the heating element must be at a significantly higher temperature than that desired for the heated beverage. The bottom (and/or side) of the flask which is in contact with the heating element is also at a higher temperature than that desired for the liquid. As the heat is conducted through the flask wall into the contained liquid, a thermal gradient is established, with the liquid directly adjacent to the heated flask wall being conductively heated to a higher temperature than that of the liquid as a whole. Although convection currents within the liquid dissipate the heat and limit the period of time when any particular portion of the liquid is exposed to the heated flask wall, such convection currents also assure that virtually all of the liquid has some exposure to temperatures significantly higher than the desired maintenance temperature of the hot beverage. This exposure of the liquid to the high temperature zone of the flask wall causes increased degradation of the heat labile elements of the beverage.

Units using insulated jackets on the storage flasks will maintain the heated beverage for a longer period of time without unacceptable degradation of flavor than will those without insulated jackets. The reasons for this increased performance is that the heating elements used with storage flasks which have insulated jackets can maintain the desired storage temperature while set at a lower temperature or by introducing heat less frequently. Because flavor degradation is a function of prolonged exposure to high temperature, the ability of these devices to use a lower temperature or to introduce heat less frequently reduces the rate of degradation. Unfortunately, as discussed above, units employing flasks with insulation jackets are more expensive to manufacture and more difficult to clean. Furthermore, cost of replacement flasks is higher.

Systems employing electric resistance conduction heating of a single-walled storage flask, including those with insulating jackets, having a further disadvantage in that the heating elements employed often heat unevenly with localized "hot spots". These localized areas create corresponding hot spots on the heating platforms and on the adjacent flask wall and expose the beverage contained in the flask to even greater temperatures than those required to maintain the temperature of the liquid. These hot spots result in more rapid deterioration of the taste and aroma elements of the stored beverage and occasionally introduce off-flavor elements by causing burns or scorching of the beverage.

One alternative to electrical resistance heating is microwave heating. Unfortunately, microwave heating also has significant disadvantages. The short wavelength microwave radiation generated by conventional microwave warming devices typically penetrates only about one-half inch into aqueous liquids. Thus microwave heaters also heat liquid unevenly, creating a "hot zone" near the surface of the liquid closest to the microwave source and depending on thermal currents in the liquid to distribute the heat throughout the liquid. Although microwave heating may not create the local zones of extremely high heat that electric resistance heat creates, it does heat liquids unevenly and the resulting hot zones can hasten the destruction of flavor and aroma elements in the heated beverage. In addition to the indirect, thermal effect mentioned above, microwave radiation also has a direct effect on many complex flavor molecules present in brewed beverages. Microwaves heat liquids by inducing translational and rotational vibrations in susceptible molecules and portions of molecules which absorb microwaves. The absorption of microwave radiation in itself can hasten the destruction of these molecules causing the flavor of the beverage to deteriorate. Microwave heating has a further disadvantage in that unshielded or poorly shielded microwave heat sources can be hazardous to the user. Microwaves have been linked to cataract development and can create interference with pacemakers. Thus, the design of a beverage warmer utilizing a microwave heat source requires that the adequate shielding be incorporated. The necessity of including adequate shielding as well as the relatively high cost of microwave heating elements are likely to cerate a cost disadvantage for devices containing microwave heat sources.

Accordingly, it would be a significant advance in the art to provide a means for storing hot beverages in a highly efficient insulating vacuum container, without the cost and convenience drawbacks associated with storage containers with insulating jackets, in combination with a means for introducing heat into the vacuum insulated flask and for preheating walls of the flask prior to receiving the hot brewed beverage. Such heat introduction means would desirably introduce heat into the contained hot beverage in a manner which avoids more than a transient exposure of the beverage to surfaces at elevated temperature, which avoids the risk of hot spots on flask surfaces in contact with the beverage, and which avoids hot zones and substantial thermal gradients in the beverage itself.

It therefore is an object of the present invention to provide a means for storing hot beverages in a vacuum insulated flask, means for preheating the vacuum insulated flask walls prior to receiving the hot beverage, and means for maintaining the temperature of the hot beverages by introducing additional thermal energy into the beverage in the flask by input of heat via a heat input portal in the vacuum insulated flask.

It is also an object of the invention to provide a method for forming heat input portals in double-walled vacuum flasks.

To my knowledge, the prior art is devoid of vacuum flasks utilizing heat input portals and heat sources to maintain the temperature of the contained liquid. A process is disclosed in Japanese Kokai Tokyo No. 81,46,553 issued Nov. 4, 1981 to Zojirushi Vacuum Bottle Co. Ltd. for creating a window in a vacuum bottle for the purpose of viewing the level of liquid inside. The process disclosed in this Japanese patent differs greatly from the processed disclosed herein. Further, the Japanese patent makes no mention of using the viewing window in any way for heating the contents of the vacuum flask.

SUMMARY OF THE INVENTION

The present invention relates generally to (1) a beverage storage vacuum insulated flask with at least one heat input portal allowing for the introduction of energy through the flask's walls to the flask's contents while maintaining the vacuum insulation; (2) and to a brewed, hot beverage system comprising such a vacuum insulated flask, together with means for introducing heat to pre-heat the flask's walls and to subsequently heat its contents.

In accordance with one aspect of the invention, there is provided a storage flask for maintaining a brewed beverage in a selected elevated temperature state that includes a pair of spaced substantially gas-impermeable inner and outer walls with interior facing wall surfaces in spaced relationship to one another that enclose an interior lacuna therebetween with subatmospheric pressure conditions in said lacuna. An external surface of the inner wall defines an inner containment volume for storing the brewed beverage. A first portion of the spaced inner and outer walls is infrared radiation-absorbing in character and forms a heat input portal, whereby heat incident on the outer wall is not conductively transmitted but is radiatively transmitted by the portal to the containment volume for maintaining the brewed beverage in said containment volume at a temperature greater than ambient; and a second portion of the inner and outer walls is infrared radiation reflective in character and bounds the first portion.

The flask preferably includes a layer of low infrared radiation absorption coefficient material selected from the group consisting of silver and aluminum on the second portion of the interior facing surfaces with the heat input portal at the base of flask and the second portion is at side wall portions of the flask. The flask may include a layer of high infrared-radiation absorption coefficient material on the heat input portal first portion of the interior facing surfaces. In one embodiment, the inner and outer walls are of stainless steel, and in another embodiment, the inner and outer walls are of glass.

In accordance with another aspect of the invention, there is provided a beverage brewing system with a flask for maintaining a brewed beverage in a selected elevated temperature state, the flask having a pair of spaced substantially gas-impermeable inner and outer walls, interior facing wall surfaces in spaced relationship to one another, and that enclose an interior lacuna therebetween with subatmospheric pressure conditions in the lacuna. An external surface of the inner wall defines an inner containment volume for storing a brewed beverage; a first portion of the spaced inner and outer walls is infrared radiation-absorbing in character and forms a heat input portal, and a second portion of the inner and outer walls is infrared radiation reflective in character, and bounds the first portion. The system also includes water heating structure, means for brewing a hot beverage from the water heated by the water heating structure, hotplate structure for receiving the flask in supporting relation for introducing heat into the flask, and means for selectively maintaining the brewed beverage at an elevated temperature by regulating the amount of heat introduced into the container through the heat input portal.

Other aspects and features of the invention will be more fully apparent from the ensuing disclosure and appended claims.

DESCRIPTION OF PARTICULAR EMBODIMENTS

Figure 1:
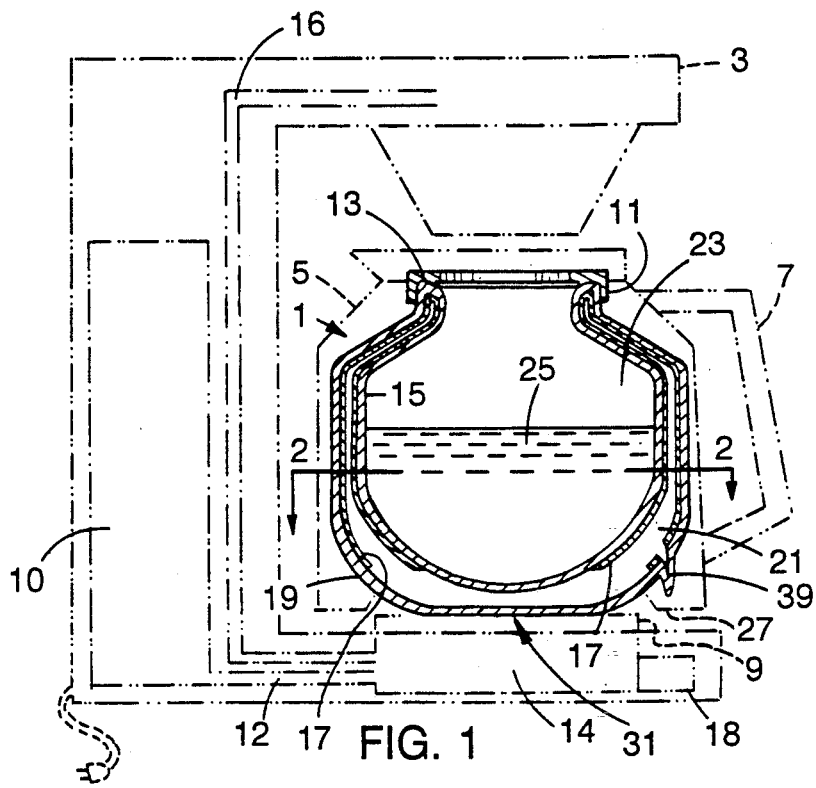
FIG. 1 is a side elevational view of a hot beverage brewing and warming system incorporating a double-walled vacuum insulated flask with a heat input portal on the bottom of the flask, and a heat source positioned directly under the heat input portal.

The present invention achieves a significant advance in the hot beverage art in the provision of a vacuum insulated flask with an heat input portal.

Double-walled glass flasks as discussed hereinearlier are old and well-established in the art. The method customarily employed for preparing glass vacuum insulated flasks involves the formation of a double-walled glass flask containing a small so called vacuum tip flow passage through which material can be introduced into the lacuna between the flask's interior and exterior walls and through which the lacuna can be evacuated, after which the small flow passage is sealed. The design and appearance of containers of such type is well-known in the art. In one example of vacuum insulated vessels of such type, the glass double-walled container is roughly spherical in shape, with a flattened bottom and an opening at the top which is surrounded by a lip.

In the prior art, coatings which reflect infrared radiant heat are often deposited on the interior walls of the double-walled flask to increase the efficiency of the flask's thermal barrier. The prior art reveals numerous ways in which infrared radiation reflective coatings can be deposited on the interior walls of double-walled glass containers. A flask with a heat input portal is formed, according to the present invention, by providing infrared radiation reflective coatings on the interior walls of the double-walled container, except in the area or region selected to be the heat input portal, using any suitable conventional methods now known or hereafter discovered for applying infrared radiation reflective coatings to substrates, e.g., methods wherein an infrared radiation reflective coating, such as a metallic coating, is deposited from a solution of a reflective coating constituent. Such deposition methods per se are old in the art.

The following deposition method is given as an example: A stannous chloride activating sensitizing solution is introduced into the lacuna between the two walls of a double-walled flask through the vacuum tip communicating with the lacuna, and the flask is agitated until the entire interior facing surfaces of the flask's walls are wetted. The stannous chloride solution is drained from the lacuna through the vacuum tip, and equal quantities of a silver nitrate solution and a reducing solution are added to the lacuna. The silver nitrate solution and the reducing solution are left in the flask lacuna for ten minutes and then drained. The flask lacuna is then rinsed. Activating or sensitizing solution, silver nitrate solution and reducing solution are commercially available, for example, from London Laboratories, Ltd., 15 Lunar Drive, Woodbridge, Conn. 06525.

Two preferred methods have been developed in the practice of the invention for the selective deposition of a infrared radiation reflective coating on the inner facing walls of a double-walled flask. Both methods leave a selected portion of the inner facing walls uncoated, thus creating an uncoated, or partially uncoated, heat input portal in an otherwise coated double-walled flask.

An example of the first method is as follows: When it is desired to create the heat input portal on the bottom of a flask, one can begin with an uncoated, double-walled flask with a vacuum tip flow passage at the juncture of side and bottom walls. The flask is inverted, and the coating solution and/or the flask is cooled and then subjected to a coating process as described above, with application of a stannous chloride solution first, followed by the introduction of the silver nitrate coating solution and the reducing solution being introduced into the lacuna between the two walls of the double-walled flask through the vacuum tip flow passage. When the coating and reducing solutions are introduced into the lacuna, the lacuna is filled with equal quantities of the two solutions, leaving only the flask bottom portion (which is the top portion in this inverted position) unexposed to the coating solution. After the coating solution is exhausted, it is removed through the vacuum tip flow passage. The flask is then rinsed, dried and sealed in the usual way. The flask is heated after rinsing to dry the coated facing interior walls. The lacuna is then evacuated through the vacuum tip flow passage by means of a vacuum pump and the vacuum tip flow passage is sealed by melting, leaving the lacuna between the walls in a vacuum condition.

In this method, the chilling of the solution and/or the flask reduces the rate of deposition. Such a reduction in rate of deposition minimized uneven deposition due to the "splashing" which may occur as the deposition liquid is introduced into the flask. Chilling the deposition solution and/or the flask reduces the speed of deposition and creates a greater degree of sharpness of the edge between the reflective coating and the uncoated portal. With small modifications, this technique can be used to create a heat input portal virtually anywhere on the vacuum flask. The advantage of this method is that it is economical and requires no special machinery to accomplish. However, one disadvantage of this technique is that it is difficult using this technique to create a vacuum flask with more than one portal. A second disadvantage of this technique is that it cannot be used to create any complex pattern or patterns of coated areas and uncoated areas.

A second method for creating partially coated interior facing walls in a vacuum insulated flask involves the use of a programmable laser. The advantage of the technique is that it is much more versatile, allowing creating an almost infinite variety of patterns of coated and uncoated areas. In this second method, an unsilvered heat input portal is created by starting with a flask with a complete, uniform deposition of infrared radiation reflective coating material on the entire surfaces of the interior facing walls. The layer of infrared radiation reflective coating material is then removed from precisely selected areas of the flask by moving a beam of coherent radiant energy along a predetermined path over the areas selected for removal, while providing sufficient intensity of coherent radiant energy to cause the layer of infrared radiation reflective coating which is in the beam path to ablate. When the coherent radiant energy is provided by a programmable etching laser, an infinite number of patterns of coated and uncoated areas can be generated, ranging from a simple clear circle or "portal" to complex grid patterns, figures, logos, words or other images. The coated flask is positioned on a platform with the area where the pattern is desired facing a programmable laser source. The laser is programmed to trace a pattern coextensive with the desired pattern at a desired power level. The laser is directed at the flask and the program is executed. The execution of the program causes the laser to be aimed at the flask in a high-resolution scan mode which causes the ablation of the deposited reflective coating, leaving clear glass in a programmed pattern.

The above-described lasing technique is useful for creating areas of clear glass of any pattern, size, shape or location within infrared radiation the reflective coating deposited on the inner facing walls of the vacuum insulated flask. The intensity of the laser beam can be adjusted so that the beam will ablate the coating on one facing wall, both facing walls, or through the interior space of the vacuum flask, ablating the coating on three or all four of the glass walls which are in the path of the beam. Where the laser is to be used at a high intensity, but it is not desired for the pattern to be created on the walls on the opposite side of the interior volume of the flask from the laser source, a light-absorbing buffer material can be placed in the interior of the flask prior to the laser treatment to absorb any laser light which penetrates through both coatings and glass walls into the interior volume of the flask. Use of such material will prevent removal of the reflective coatings on the walls which are opposite the interior flask volume from the laser source.

This technique is useful not only for creating heat input portals, but is also useful for creating non-coated areas in the vacuum flask for other purposes. For example a clear, long narrow window containing reflective scale markings can be created on the side of the flask for purposes of viewing the liquid and indicating the volume of liquid in the flask. The technique can also be used to etch or ablate into the flask a trademark or logo of the manufacturer or vendor of the flask or for creating decorative or informational patterns in the flask by selective removal of infrared radiation reflective coating.

When this second technique is used for creation of heat input portals, it has the advantage over the first technique of allowing variable removal of the infrared radiation reflective coating from the heat input portal area. For example, because the heat input portal is both a portal for the entry and exit of heat, a partially reflective and partially non-reflective gridwork of coated and clear areas within the "portal" may maximize the effectiveness of the portal for both introducing thermal energy into the flask and reducing heat loss from the flask. The grid pattern and the relative portions of clear and infrared radiation reflective areas within the portal can be adjusted to optimize conditions for each application. The spacing, thickness and design of the clear and coated areas within the portal may be adjusted to compensate for variations in the volume of the flask, the size, wattage and efficiency of the heat source, the ratio of the flask volume to heat source area and the desired maintenance temperature for the particular application for which the flask is designed.

The technique requires a laser emitting light at a wavelength to which the glass walls of the flask are transparent, but not to the reflective coating. With the type of glass which I have used, I have found the nd:YAG laser (neodymium-doped Ytterium, Aluminum, Garnet laser), such as the InstaMark Elite (TM) Q switched YAG Laser, manufactured by Control Laser Corporation, 7503 Chancellor Drive, Orlando, Fla. to be effective. If the flask walls contain substances which absorb light at the wavelength normally emitted by the YAG laser, lasers with other wavelengths may be preferable. It may also be possible to use the wave frequency doubling feature of the InstaMark laser or other nd:YAG lasers to avoid the absorption problem. This may also reduce any reflection from the metallic coating that is being ablated. The lasing technique can be used before or after the flask is evacuated and sealed, although the process may be most efficient when performed on an evacuated, sealed flask. Where large amounts of coating are to be removed by this method, it may be desirable to perform the ablation prior to permanent sealing of the flask to allow a cleaning solution to be introduced after ablation to flush out the material which has been removed by the process.

It is noted that the open top of the vacuum insulated flask is, of course, a further heat transmission portal. With appropriately positioned heat sources, the open top, as well as the fully or partially uncoated portion of the flask wall or bottom, can be used as a portal for introducing heat energy into the vessel. In most applications, the open top of the flask is fitted with a removable lid which is placed on the flask when it is removed from the brewing apparatus. Some models have lids which engage the brewing apparatus to allow for the introduction of the brewed beverage into the interior volume of the flask. Some of these lids seal the tops of the flasks when removed from the brewing apparatus. Because the flask shown in the drawings is shown on the brewing apparatus, no separate lid is illustrated.

The uncoated portions of the glass inner and outer walls of the vacuum flask are absorptive structures and therefore at the same time act as good emitters of infrared radiation in the process of transmitting heat to the interior volume of the flask. While not wishing to be bound by theory or mechanism of operation, it appears that the glass I have used in making vacuum flasks is substantially infrared absorbent in the range of operation (below one hundred fifty degrees Celsius), and that, as the outer wall of the vacuum flask heats up through heat conduction from an external heat source, the outer wall also becomes an emitter of infrared radiation.

The inner wall is separated from the outer wall by a vacuum and because of the efficiency of the insulating properties of the vacuum in the lacuna between the inner and outer walls of the vacuum flask, the inner wall and the flask's interior volume receive virtually no conductive or convective thermal energy. However, infrared energy travels effectively through the vacuum. When the heat input portal is positioned on the bottom of the flask, the portal's inner wall is also in constant contact with the liquid contents of the flask. These two factors can allow significant warming of the inner portal wall as it absorbs infrared energy and also heats of the flask contents by transmission of thermal energy to the inner portal wall.

The vacuum insulated flask may be placed in a metal or plastic housing which surrounds the walls of the vessel provided the housing is either open or heat conductive immediately adjacent to the heat input portal in the vacuum insulated flask. Techniques for securing a vacuum insulated flask in a housing are old and form no part of the present invention. For example, the flask may be secured in the housing by means of a screw-in bottom supporting ring or top supporting ring. The top portion of the housing may be connected to the bottom portion by means of a snap-in lip or glued together. Some housings are designed for easy removal and replacement of the vacuum insulated flask, others are permanent. Usually, the top of the vacuum insulated flask is surrounded by a resilient gasket to form a water-tight seal between the lip of the vacuum insulated flask and the housing. Many brewing machines include a separate top to be inserted on the flask and its housing (if any) for storing liquid after brewing when the flask is removed from the brewing platform.

Thermal energy is introduced through the heat input portal of the flask by means of a heat source such as a resistance heater of the type currently used on coffee brewing machines. The manufacture of such heat sources is well-known in the art. Such a heat source can be placed in the platform of the device.

Referring now to the drawings, FIG. 1 shows a vertical cross-section through a double-walled vacuum flask 1 of glass or stainless steel containing an illustrative embodiment of the heat input portal. The brewing apparatus 3, flask housing 5, handle 7, and hot plate 9 are represented by dotted lines. Also shown in dotted lines are water tank 10 to be filled with cold water before brewing and with its outlet connected by first conduit 12 to the inlet opening of electrically powered flow-through heater 14 which is controlled by thermostatic regulator 18. The flow-through heater 14 not only heats and transports heated water through its outlet opening and second conduit 16 to the brewing apparatus 3 but also delivers heat to hotplate 9. The top of flask 1 is connected to housing 5 by means of a sealing gasket 11 which surrounds lip 13 of the double-walled vacuum flask 1. In addition to the flask lip 13, the flask comprises an inner wall 15, partially coated with an infrared radiation reflective coating 17, an outer wall 19, partially coated with an infrared radiation reflective coating 17, an evacuated lacuna 21 between the inner and outer walls, and an enclosed volume 23.

In the flask as shown in the drawing, the enclosed volume 23 is partially filled with a liquid beverage 25. The flask is supported within the housing by the curvature of housing 5 underneath the flask, so that a retaining portion 27 of the housing 5 is created. Retaining portion 27 has an inner circumference less than the outer circumference of the enclosed flask 1. As discussed above, the retaining portion 27 may or may not be removable.

The outer wall 19 of the vacuum flask 1 is flattened on the bottom portion so that it may rest upon hot plate 9. The bottom portions of both the outer wall 19 and the inner wall are partially or totally free of infrared radiation reflective coating 17, creating heat input portal 31. Portal 31 is comprised of juxtaposed, spaced coating-free (or reduced coating) areas of inner wall 15 and outer wall 19. A coating-free (or reduced coating) area merely on a single wall would not allow to a sufficient extent the passage of heat into the flask from an external source and is not a heat input portal.

Figures 2, 3:
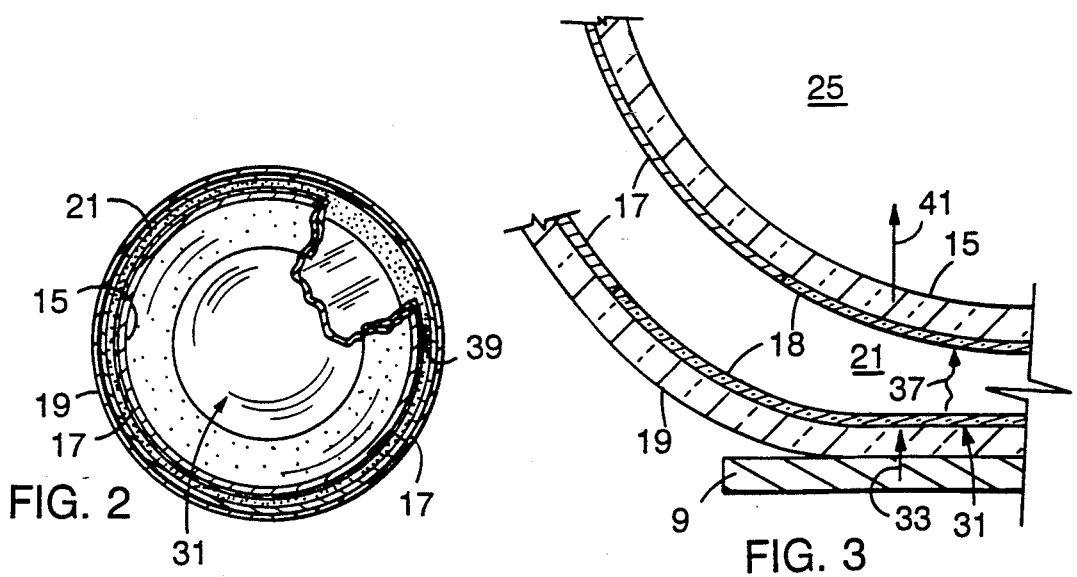
FIG. 2 is a plan view, partially broken away, of the lower half of vacuum insulated flask along section line 2—2 of FIG. 1, showing the heat input portal and the lacuna between the interior and exterior walls of the double-walled vacuum insulated flask.
FIG. 3 is a diagrammatic view of a portion of the vacuum insulated flask and heat input portal showing heat transfer relationship.

With reference to FIG. 3, thermal energy 33 emanating from the external hot plate 9 impinges on the heat input portal 31 and is absorbed by outer wall 19. Because outer wall 19 is heated up, it becomes an infrared radiation emitter. The intensity of emitted infrared radiation is strongly dependent on the temperature of the emitter itself, and is also dependent on the infrared radiation properties of the surface of the emitter, a fact playing an important role for the transfer of heat from hotplate 9 to beverage 25. As there is no infrared reflective coating of the interior facing surfaces of outer wall 15 and inner wall 19 in the area of heat input portal 31, absorption and therefore emission of infrared radiation is relatively high. In other words, uncoated outer wall 19 behaves much more like a so-called "ideal black body radiator" than the same wall with infrared reflective coating 17 formed for example of a layer of silver, glass being closer to the properties of a black body radiator than stainless steel. Infrared radiation of relatively high intensity emitted from outer wall 19 impinges on inner wall 15. The infrared radiation properties of the inner facing surface of inner wall 15 are also a significant factor affecting the fraction of infrared radiation absorbed by it. Because inner wall 15 also is formed of glass or stainless steel the absorption rate of the impinging infrared radiation is relatively high. The temperature of hotplate 9 and to a substantial extent the infrared radiation properties of both facing surfaces of inner wall 19 and outer wall 15 contribute to the amount of infrared radiation absorbed by inner wall 19 in the heat input portal region. Optionally, a layer 18 of high infrared absorption material may be provided on either or both of the inner facing surfaces of walls 15, 19 as diagrammatically indicated in FIG. 3.

Inner wall 15 is thus heated by infrared radiation 37 (but not by conduction due to the vacuum insulating) and transfers heat 41 to beverage 25 to maintain that beverage at an elevated temperature.

FIG. 1 also shows the vacuum tip flow passage 39 through which the deposition medium may be introduced into the lacuna. In the completed flask flow passage 39 is sealed, usually by melting.

FIG. 2 is a plan view, partially broken away, of the lower half of the vacuum flask 1 shown in FIG. 1 along the cross sectional line 2—2. In FIG. 2, the inner wall 15, outer wall 19, evacuated lacuna 21, infrared radiation reflective coating 17, flow passage (sealed) 39 and heated input portal 31 are shown. A portion of the inner wall 15 is removed to reveal the infrared radiation reflective coating 17 on the outer wall 19. The coating free area of the outer wall 19 is greater in circumference than that of the inner wall 15, an indication that the infrared portal in the pictured flask was created using the first method discussed above.

What is claimed is:

1. A storage flask for maintaining a brewed beverage in a selected elevated temperature state comprising
    a pair of spaced substantially gas-impermeable inner and outer walls, said inner and outer walls having interior facing wall surfaces in spaced relationship to one another, that enclose an interior lacuna therebetween with subatmospheric pressure conditions in said lacuna; said flask having an open top, a bottom and side walls between the top and bottom and further wherein there is no physical contact between the facing wall surfaces within the interior lacuna; said inner wall defining an inner containment volume for storing said brewed beverage; said bottom of said spaced inner and outer walls being infrared radiation-absorbing in character and forming a heat input portal, whereby heat incident on said outer wall is not conductively transmitted but is radiatively transmitted by said portal to said containment volume for maintaining the brewed beverage in said containment volume at a temperature greater than ambient; and said side walls of said inner and outer walls being infrared radiation reflective in character, said reflective portion bounding said absorptive portion.

2. A flask according to claim 1 wherein the infrared radiation-absorbing character of said bottom of said spaced inner and outer walls is a function of the infrared-radiation properties of the material of which said respective walls are made.

3. A flask according to claim 1 wherein a layer of low infrared radiation absorption coefficient material on said side walls of said interior facing surfaces of said inner and outer walls provides said infrared radiation reflective character.

4. A flask according to claim 3 wherein said layer of low infrared radiation absorption coefficient material is selected from the group consisting of silver and aluminum.

5. A flask according to claim 3 wherein said inner and outer walls are of metal.

6. A flask according to claim 5 wherein said layer of low infrared radiation absorption coefficient material is selected from the group consisting of silver and aluminum.

7. A flask according to claim 3 wherein said inner and outer walls are of glass.

8. A flask according to claim 7 wherein said layer of low infrared radiation absorption coefficient material is selected from the group consisting of silver and aluminum.

9. A storage flask for maintaining a brewed beverage in a selected elevated temperature state comprising
    a pair of spaced substantially gas-impermeable inner and outer walls, said inner and outer walls having interior facing wall surfaces in spaced relationship to one another and that enclose an interior lacuna therebetween with subatmospheric pressure conditions in said lacuna; said inner wall defining an inner containment volume for storing said brewed beverage; a layer of high infrared-radiation absorption coefficient material on a first portion of said interior facing surfaces of said spaced inner and outer walls and forming a heat input portal, whereby heat incident on said outer wall is not conductively transmitted but is radiatively transmitted by said portal to said containment volume for maintaining the brewed beverage in said containment volume at a temperature greater than ambient; and a second portion of said inner and outer walls being infrared radiation reflective in character, said second portion bounding said first portion.

10. A beverage brewing system comprising a brewing means and a flask for maintaining a brewed beverage in a selected elevated temperature state, said flask comprising
    a pair of spaced substantially gas-impermeable inner and outer walls, said inner and outer walls having interior facing wall surfaces in spaced relationship to one another, that enclose an interior lacuna therebetween with subatmospheric pressure conditions in said lacuna; said inner wall defining an inner containment volume for storing said brewed beverage; a first portion of said spaced inner and outer walls being infrared radiation-absorbing in character and forming a heat input portal, whereby heat incident on said outer wall is not conductively transmitted but is radiatively transmitted by said portal to said containment volume for maintaining the brewed beverage in said containment volume at a temperature greater than ambient, and a second portion of said inner and outer walls being infrared radiation reflective in character, said second portion bounding said first portion, water heating structure, said brewing means including means for brewing a hot beverage from the water heated by said water heating structure, hotplate structure for receiving said flask in supporting relation for introducing heat into said flask, means for flowing a hot beverage from said brewing means into said flask on said hotplate structure, and means for selectively maintaining the brewed beverage in said flask at an elevated temperature by regulating the amount of heat introduced into said flask from said hotplate structure through said heat input portal.

11. The system of claim 10 and further including structure thermally coupling said hotplate structure to said water heating structure.

12. The system of claim 10 wherein a layer of low infrared radiation absorption coefficient material on said second portion of said interior facing surfaces of said inner and outer walls provides said infrared radiation reflective character.

13. The system of claim 12 wherein said inner and outer walls are of metal.

14. The system of claim 13 wherein said layer of low infrared radiation absorption coefficient material is selected from the group consisting of silver and aluminum.

15. The system of claim 14 wherein said flask has a base and side wall portion and said heat input portal is at said base of said flask and said second portion is at said side wall portions of said flask.

16. The system of claim 12 wherein said flask has a base and side wall portions, said inner and outer walls are of glass, said heat input portal is at said base of said flask and said second portion is at said side wall portions of said flask.

* * * * *